Nov. 10, 1959 C. I. BOHLEN 2,912,252
ANTI-CHATTER DEVICE FOR VEHICLES
Filed June 27, 1958 3 Sheets-Sheet 1

INVENTOR.
CHARLES I. BOHLEN
BY
Caesar and Rivise
ATTORNEYS

INVENTOR.
CHARLES I. BOHLEN
BY
Caesar and Rivise
ATTORNEYS.

INVENTOR.
CHARLES I. BOHLEN
BY
Caesar and Rivise
ATTORNEYS.

United States Patent Office 2,912,252
Patented Nov. 10, 1959

2,912,252
ANTI-CHATTER DEVICE FOR VEHICLES
Charles I. Bohlen, Doylestown, Pa.
Application June 27, 1958, Serial No. 745,086
4 Claims. (Cl. 280—104.5)

This invention relates to axle suspensions for vehicles, and it particularly relates to tandem axle suspensions for heavy duty trailers and the like.

As is well known in the art, when the brakes are applied to the wheels of a vehicle such as a trailer or the like, the axles have a tendency to twist and roll with the brake drums on the wheels because the friction between the brake shoes and the drums acts as a kind of binding force between them; consequently, they, in effect, act as a unit. As a result, anything attached to the axle tends to twist with a rotary motion.

Various means have been provided for preventing the aforementioned twisting motion of the axles and these means have included springs, beams, radius rods, torque arms, etc., depending on the type of suspension.

One of the most commonly used suspension means is the multiple axle suspension which comprises a pair of linearly-arranged leaf springs, each of which flexibly supports one of the axles. The axles are also connected by radius rods or the like to hangers on the frame of the vehicle. These hangers additionally serve to support the outer ends of the leaf springs while, on their relatively adjacent inner ends, the springs are supported at opposite sides of a rocker arm. In this manner, the load is split equally between the axles because the rocker arm permits one axle to raise or lower in relation to the other while still maintaining an approximately even load distribution on each axle.

The above type of construction generally performs quite adequately under static conditions of operation; however, problems arise under the non-static conditions which are normally encountered on the road. For example, roads generally include grades and inclines and are often bumpy and uneven. If the brakes are applied on a grade or at a place where one set of wheels is on a bump while the other set is on a smooth or lower surface of the road, the wheels on the higher portion of the road will take the full weight of the load while the other wheels will momentarily hang in the air. This causes an imbalance which, due to the law of action and reaction, results in a shaft of the load to the other wheels causing these other wheels to drop while the first wheels rise.

This repeated shifting of the load results in an oscillating or rocking movement of the vehicle which is often referred to as "chattering". This chattering, which is generally unpleasant and sometimes dangerous, occurs most frequently when the vehicles are empty or only partially loaded. In such vehicles, the duration of oscillation is far greater than in the case of fully loaded vehicles because the weight of the fully loaded vehicles tends to substantially dampen the oscillations.

It is one object of the present invention to overcome the above-noted deficiencies by providing an anti-chatter system for trailers and similar vehicles which will effectively prevent any rocking or oscillating motion of the vehicle when the brakes are applied, regardless of the condition of the road.

Another object of the present invention is to provide an anti-chatter system for trailers and similar vehicles which is generally simple in construction, consists of a minimum of parts, is extremely sturdy, and may be easily applied to most vehicles of this general type.

Another object of the present invention is to provide an anti-chatter system for trailers and similar vehicles which becomes automatically effective upon actuation of the brakes and which becomes automatically deactivated upon release of the brakes.

Other objects and many of the attendant advantages of this invention will be readily appreciated as the same becomes better understood by reference to the following detailed description when considered in connection with the accompanying drawings wherein.

Figure 1:
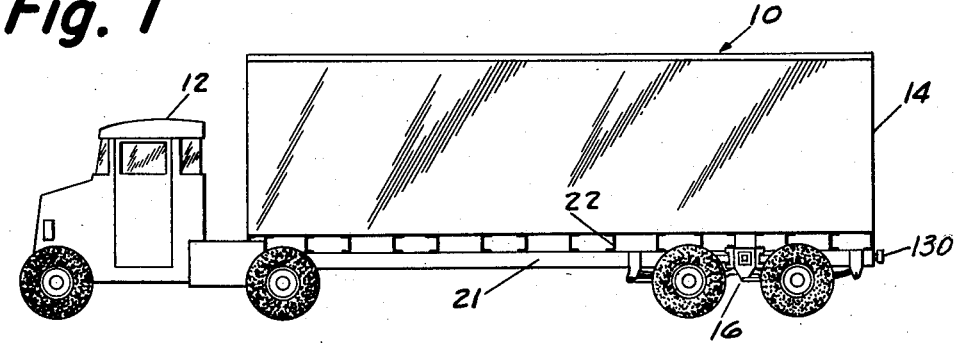
Fig. 1 is a side elevational view of a tractor and trailer having a mechanism embodying the present invention.

Referring now in greater detail to the figures of the drawings wherein similar reference characters refer to similar parts, there is shown a tractor trailer assembly generally designated 10 which comprises a prime mover 12 and a trailer 14 releasably hitched to the prime mover.

The trailer 14 is of standard construction except for an axle suspension system which is indicated generally at 16.

The axle suspension system 16 comprises a pair of hangers 18 and 20 fixedly attached to and depending from the I-beam 21. Such I-beams, together with cross beams 22, comprise frame 23 of the trailer.

The hangers 18 and 20 are of generally similar construction so that a description of one serves as a substantial description of the other. Taking hanger 18 as an example therefore, this hanger comprises a pair of walls, indicated at 24. The walls 24 are connected by webs 25 while, at their bottom ends, they form bearings for a pin or bolt 26. The hanger 20, although of generally the same shape as hanger 18, has a bottom bearing portion which is so constructed that the pin or bolt 28, corresponding to pin or bolt 26, is somewhat offset from the center line of the hanger.

Between the walls 24 of hanger 18, in vertically-spaced relation to pin 26, is a convexly-curved bearing surface 30, while a similar bearing surface 32 is provided between the walls of hanger 20.

Fixed to frame 23, between the hangers 18 and 20, is a hanger 36 comprising a pair of walls 38 having mating openings in bearing portions 40 between which are provided bearings 41 through which extends a transverse pin 42. This pin has a head 44 on one end bearing against the corresponding bearing portion 40 and held in place by machine screws 46; while at its opposite end, it is provided with a dust cover 48 held in place by machine screws 50.

Rotatably mounted on the pin 42 is a hub 52 from opposite sides of which extend arms 54. The hub 52 and arms 54 constitute a unitary rocker arm 56.

The rocker arm 56, having its mid-point in vertical alignment with the pin 42, is provided with an integral lug 58 extending into the interior of a hollow bracket 60 through an aperture 62 in the bottom wall of the bracket. The bracket 60 is held between two spaced portions of the I-beam 21; the I-beam actually comprising two separate beams.

Extending through a transverse hole in the upper portion of the lug 58 is a pin 64 on which is positioned a pair of generally square or rectangular blocks 66, one on each side of the lug 58. The blocks 66 are held in position by the head 68 of the pin 64 bearing against one of the blocks, while a cotter pin 70 extends through a transverse hole at the other end of the pin adjacent the other block.

Overlying the lug 58 is a yoke 72 having depending arms 74, one on each side of lug 58. Each arm 74 is provided with a generally square or rectangular, downwardly opening slot 76 in which is received a corresponding block 66. At each end of the yoke 72 is a boss 78 from which extends a knob 80 having a convex hemispherical end 82.

Each knob 80 is encompassed by a concave end 84 of a piston 86, the opposite end of which is longitudinally movable in a cylinder 88. The concave end 84 of each piston 86 is provided internally with a hemispherical seat 90 upon which the end 82 of the corresponding knob 80 is adapted to bear. The seat 90 is also provided with a vent opening 92.

The pistons 86 each comprise a hollow body portion 94 having the concave end 84 positioned outside the cylinder 88 and having a closure wall 96 at the opposite end inside the cylinder. The closure wall 96 is provided with a flexible cup member 98 at the end thereof; this cup member 98 being constructed of rubber or the like and being movable within the cylinder 88 with a wiping and sealing action on the inner walls of the cylinder. The vent opening 92 acts to vent any accumulation of air from the hollow interior of the body portion 94.

Each cylinder 88 is provided with an externally-threaded, inwardly-tapered, nipple portion 100 at its inner end; and this nipple portion 100 is engaged in an internally-threaded, complementary bushing portion 102 provided in the vertical wall 104 of the hanger 36.

At its outer end, each cylinder 88 is provided with an end wall 106 in which is provided a threaded opening 108. In each of these openings 108 is coupled a threaded end 110 of a common fluid conduit 112.

Interposed in the conduit 112, between the two cylinders 88, is a manually-operated cut-off valve 114 and a normally-open solenoid-operated valve 116. The valve 116 is operated by a solenoid 118 which is in electrical circuit with the brake light system on the vehicle.

Figure 2:
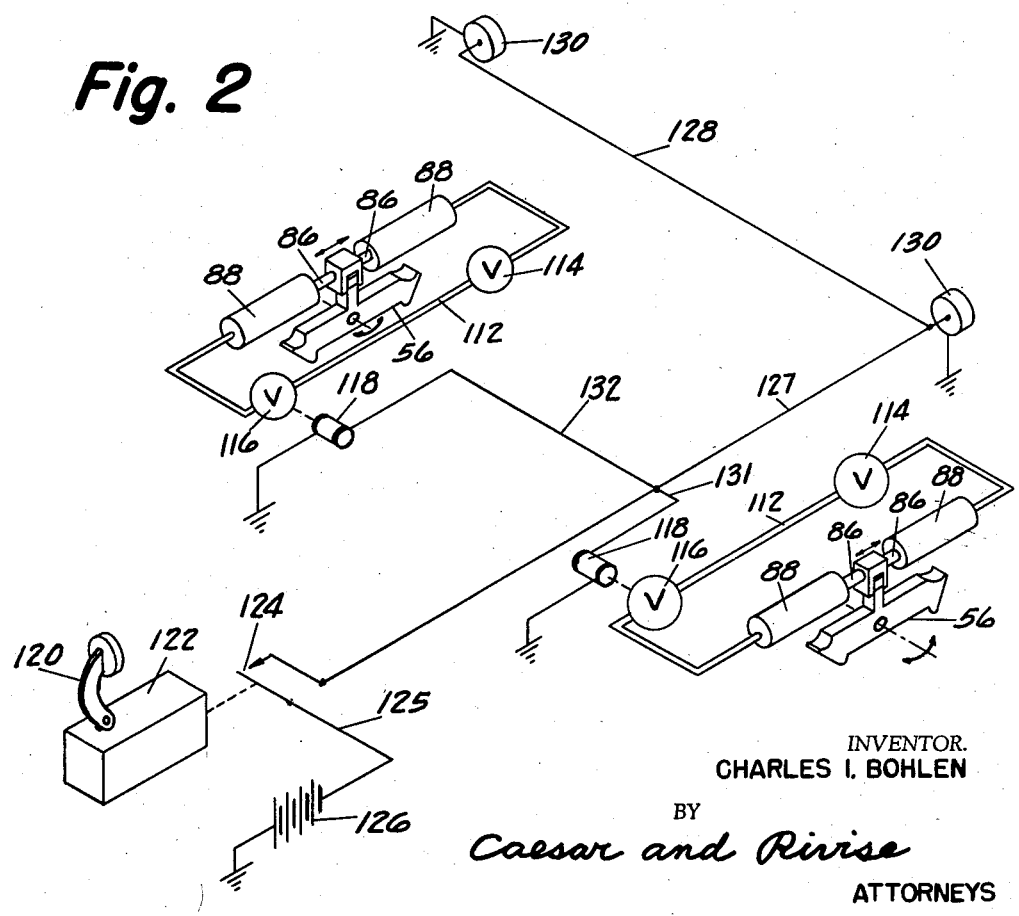
Fig. 2 is a schematic view of the control system for the rocker arm.

The brake light system is illustrated schematically in Fig. 2 and comprises a brake pedal 120 situated in the prime mover 12 and connected to a brake actuating system generally indicated at 122. This system 122 may be either of the pneumatic, hydraulic or vacuum type common in the art; but whichever system is used, its actuation by brake pedal 120 causes normally-open switch 124 to close. Switch 124 is connected by line 125 to a battery 126 and by lines 127 and 128 to brake lights or lamps 130. The solenoids 118 for the right and left hand pair of leaf springs are connected into line 127 by lines 131 and 132.

In operation, when the pedal 120 is pushed to cause system 122 to close switch 124, this causes the circuit to be completed between battery 126 and lamps 130 resulting in lighting of the lamps 130. At the same time, it energizes solenoids 118 through lines 131 and 132 to close the valves 116. When the brake pedal 120 is released, the circuit is de-energized and the valve 116 moves back into its normally-biased open position.

When each solenoid valve 116 is open, the two corresponding pistons 86 act in the manner of dashpots, whereby when the distribution of the load causes the lug 58 to rock in one direction, the resulting linear movement of the yoke 72 in that direction is somewhat retarded by the fluid behind the opposed piston. The fluid displaced in this dashpot action if, of course, caused to flow into the other cylinder behind the opposite piston. However, when the valve 116 is closed, there can be no displacement of the fluid behind either piston; consequently, linear movement of the yoke 72 is prevented. This, in turn, prevents any rocking action of lug 58 so that rocker arm 56 becomes rigid.

The relative position in which the rocker arm 56 becomes rigid depends on the distribution of the load at the moment of applying the brakes so that there are practically an infinite number of such positions. In whatever position the rocker arm 56 becomes rigid however, it immediately prevents any shifting of the load from one axle to the other and thereby prevents any oscillation of the vehicle.

If it is desired to eliminate any relative movement between the axles at all times, even when the brakes are not applied, the manual valve 114 is used.

It is to be understood that the solenoid valve can be used in the system either by itself or together with the manual valve as shown; or only the manual valve or any other type valve may be used by themselves in the event that any situation occurs where this would be desirable. In any event, the utilization of an automatic, semi-automatic or non-automatic system would depend on the type of valve used and the system into which it is connected.

Each arm 54 of the rocker arm 56 comprises a pair of parallel plates 134 depending from an upper concave portion 136 which forms a convexly-curved inner bearing surface 138. The plates 134 of each arm 54 are each provided at the lower parts of their outer ends with a downwardly-offset bearing portion 140, and between the bearing portions 140 of each arm there extends a pin or bolt 142 having a head 144 at one end and a lock nut 146 at its opposite end.

In the space between the bearing surface 138 and the pin 142 of one arm 54 are slidably positioned the corresponding end-most leaves of a lead spring 148 while between the bearing surface 138 and the pin 142 of the other arm 54 are slidably positioned the corresponding end-most leaves of a leaf spring 150. The opposite end of the leaf spring 148 is similarly positioned between the bearing surface 30 and pin 26 of hanger 18 while the opposite end of the leaf spring 150 is similarly positioned between the bearing surface 32 and pin 28 of the hanger 20.

Mounted on the center portion of leaf spring 148 is an axle supporting means comprising a pair of inverted U-bolts 152 that overlie the spring and extend down through perforated ears or lugs 154 of a bearing plate 156 and through holes in a bottom bearing plate 158 where the bolts are secured in place by nuts 160. Between the bridge portions of the U-shaped bolts 152 and the spring 148 is a bearing plate 162 having concave cradle portions to receive and hold the bridge portions of the bolts.

The bearing plate 162 is provided with a central aperture 164 through which extends a bolt 166; this bolt also passing through mating holes in the leaves of the spring 148. The head 168 of the bolt is received in an upwardly-opening socket 170 on the bearing plate 156 while a nut 172 within aperture 164 holds the bolt in place. In this manner, the bearing plate 162 is held in position.

The bearing plates 156 and 158 are each provided with complementary curved bearing surfaces between which is rotatably positioned an axle 174 which extends transversely of the vehicle.

Extending from bearing plate 156 is a bracket 176 comprising a pair of spaced ears between which is pivotally positioned one end of a link or radius rod 178 by means of a pivot pin or bolt 180. The opposite end of rod 178 is pivotally positioned between the spaced ears of a bracket 182 depending from hanger 36 by means of a pin or bolt 184.

The spring 150 is mounted between rocker arm 56 and hanger 20 in substantially the identical manner as spring 148 and is also provided with inverted U-bolts 186, bearing plate 188, bolt 190, and bearing plates 192 and 194, all in similar manner to their corresponding parts associated with spring 148. The bearing plates 192 and 194 support a transverse axle 196, and a link or radius rod 198 is pivotally connected between bracket 200 on bearing plate 192 and bracket 202 on hanger 20, all in similar manner to the rod 178 and its associated parts.

Figure 3:
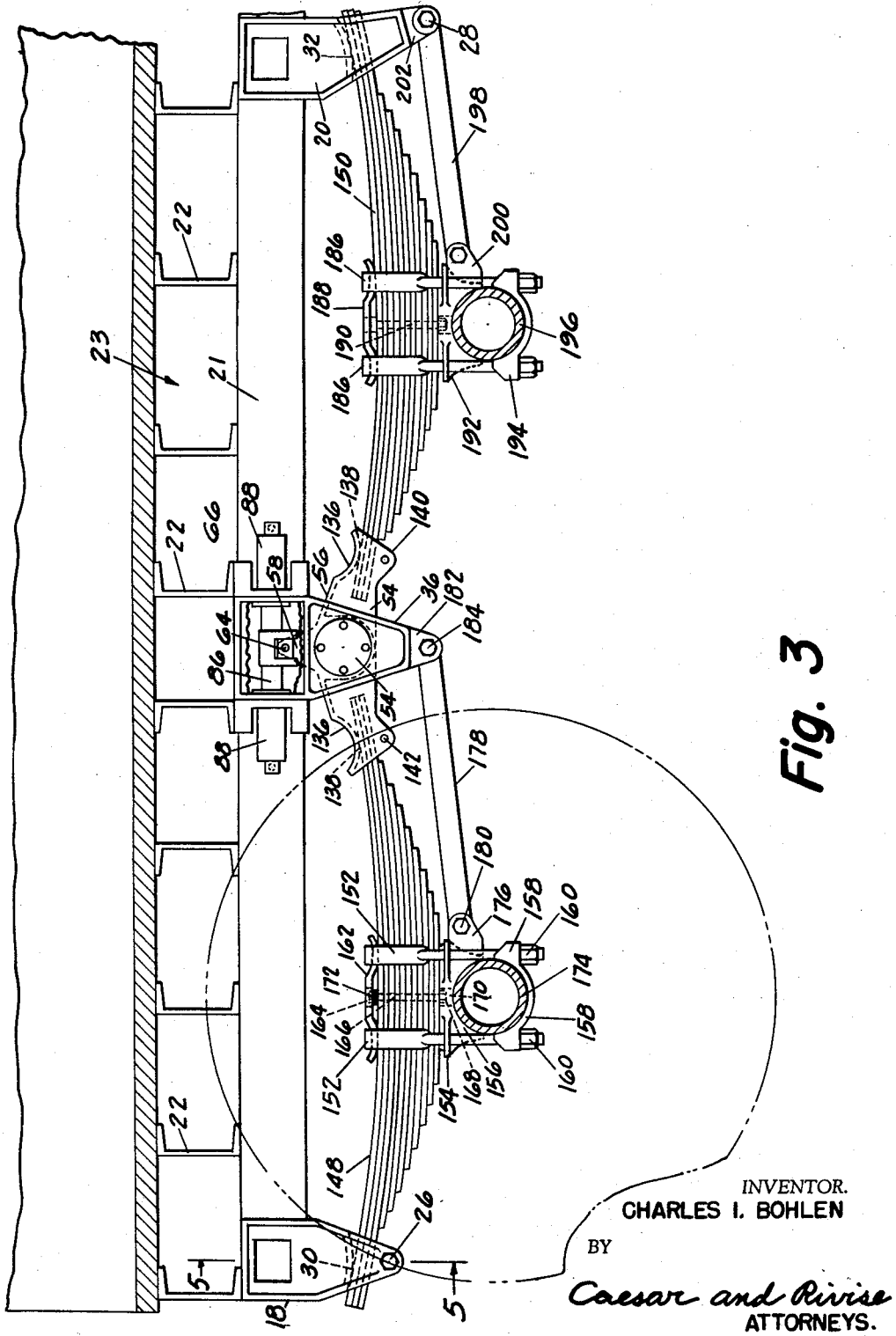
Fig. 3 is a side elevational view of the mechanism embodying the present invention.
Figure 4:
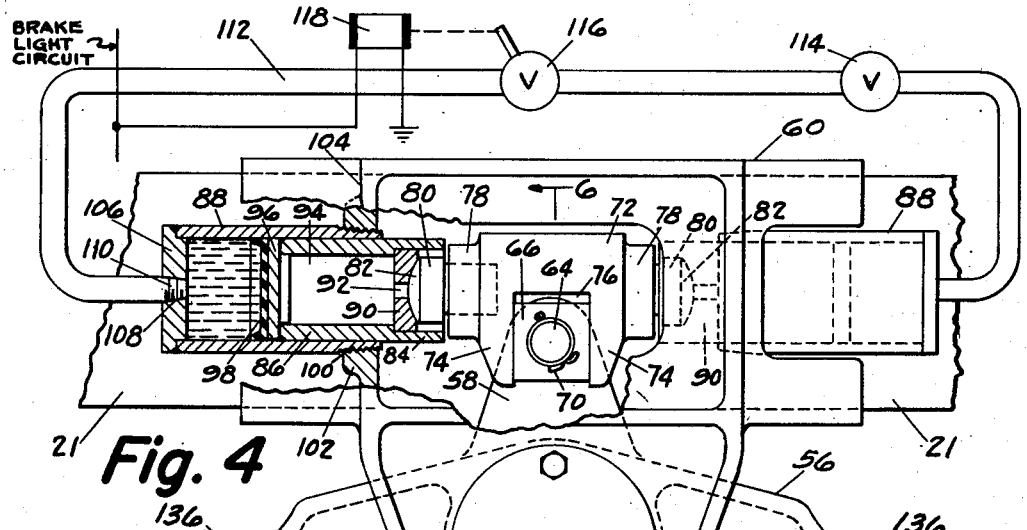
Fig. 4 is an enlarged, detailed, side elevational view of the rocker arm and its associated parts.
Figure 5:
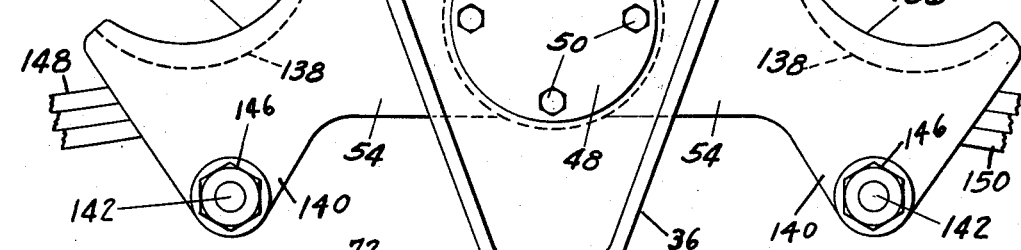
Fig. 5 is a sectional view of one of the spring supporting hangers, taken on line 5—5 of Fig. 3.
Figure 6:
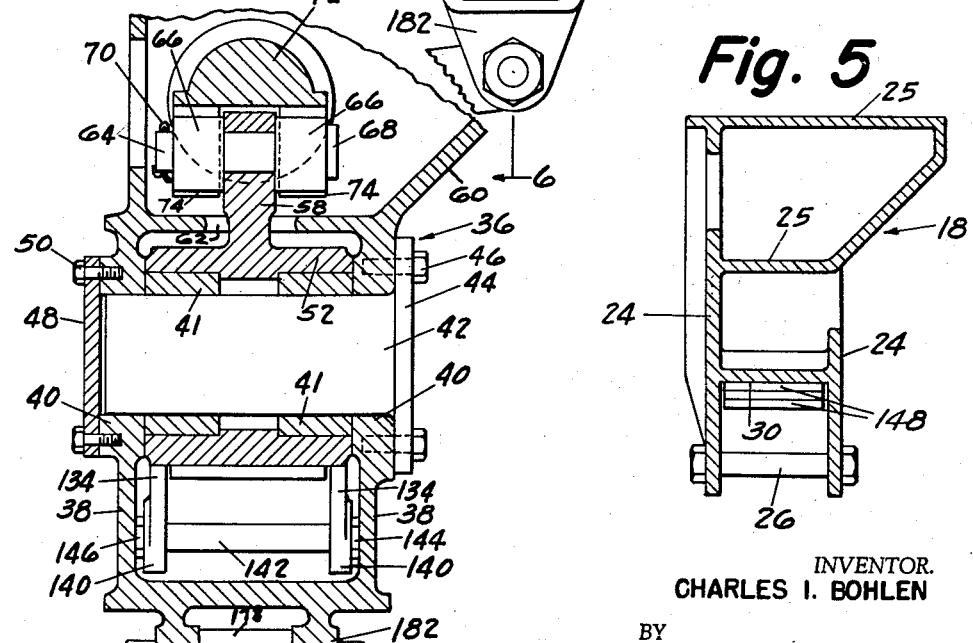
Fig. 6 is a sectional view taken on line 6—6 of Fig. 4.

The operation of the device is obvious from the above description and drawings. Briefly, when the vehicle is traveling to the right, as viewed in Fig. 3, the radius rods 198 and 178 are pulling the axles and their spring assemblies along with the vehicle. During this motion, the rocker arm 56, acting through the springs 148 and 150, continuously acts to distribute the load equally between the two axles; the pistons 86 acting as dashpots to prevent any too sudden movement of the rocker arm. However, upon the application of the brakes, the solenoid valve 116 is immediately actuated to close the conduit 112 forming the closed system between the two cylinders 88, so that the fluid behind the pistons cannot be displaced. This prevents any further rocking movement of the rocker arm 56 which is thereby, in effect, locked in substantially the same position in which it was when the brakes were applied. Consequently, the two springs 148 and 150 become rigidly connected to form what is, in effect, a single spring so that no relative oscillation can take place between them.

When the brakes are released, the fluid circuit between the cylinders 88 is re-established and the springs 148 and 150 can again act in tandem.

The above description has been primarily concerned with the so-called short rocker arm type of suspension wherein two or more linearly arranged leaf springs are connected by the rocker arm between adjacent ends; or, in other words, where the rear end of one spring is connected by the rocker arm to the front end of the other spring. However, the invention can also be applied to a system using the so-called long rocker arm wherein the rocker arm is connected between the rear end of one of the springs and the front end of the other spring. The general arrangement would be substantially the same as with the short rocker arm, the lug extending up from the center of the long rocker arm and being positioned in a yoke device similar to that described above and the yoke device being associated with a similar type of fluid pressure system.

It should be understood that although this invention has been described with reference to a trailer, it may also be used with any number of other types of vehicles whether self-propelled or of the dead-weight type and whether driven by an internal combustion engine or any other type of driving means. In other words, it may be applied to any wheeled vehicle having a tandem type of axle assembly.

Obviously many modifications and variations of the present invention are possible in the light of the above teachings. It is, therefore, to be understood that within the scope of the appended claims, the invention may be practiced otherwise than as specifically described.

What is claimed as the invention is:

1. A vehicle comprising a body, a frame supporting said body, front and rear axle assemblies suspended from said frame, and wheels on said axle assemblies, said axle assemblies each including a leaf-spring means having one end supported by said frame and an opposite end supported by a rocker arm pivotally connected to said frame, said leaf spring means being supported by opposite sides of said rocker arm relative to its pivotal connection, an axle positioned on the intermediate portion of each spring means, said axles supporting said wheels, a lug on said rocker arm in alignment with said pivotal connection, a pair of blocks connected to said lug, one block being on one side and the other on the opposite side of said lug, a yoke having a pair of arms with one arm depending on one side and the other on the opposite side of said lug, a slot in each arm, each of said blocks being engaged in a corresponding slot, a knob having a hemispherical abutment portion on each end of said yoke, a fluid-pressure cylinder connected to said frame adjacent each end of said yoke, a piston longitudinally movable in each cylinder, each piston having an exterior end outside its respective cylinder, each exterior end having a concave seat portion to receive the corresponding abutment portion, a fluid circuit between said cylinders, and a cut-off valve means interposed in said fluid circuit between said cylinders.

2. The vehicle of claim 1 wherein each piston comprises a hollow, cylindrical body having a flexible concave cup portion at it inner end within its corresponding cylinder, and wherein said seat portion is provided with a vent opening connecting the interior of said body with atmosphere.

3. In an axle suspension system for vehicles comprising a pair of linearly arranged, wheeled axle-supporting elongated springs, the remote ends of which springs being connected to a fixed support on the vehicle, the adjacent ends of which springs being connected to opposite ends of a rocker arm which is pivoted intermediate its ends to said fixed support; a means for locking said rocker arm against pivotal movement comprising an upstanding lug on said rocker arm between the ends of said rocker arm, a fluid-pressure cylinder adjacent each end of said lug, a piston movable in each cylinder and bearing on said lug, a common fluid-pressure system operatively connected to each of said cylinders and a normally open valve in said system which locks said pistons and said rocker arm when closed.

4. In a wheeled vehicle having wheel brakes, wheel brake actuating means, a frame, a pair of adjacent wheel-carrying axles, pairs of longitudinally spaced elongated springs each supporting an axle, rocker arms pivoted intermediate their ends to said frame, the remote ends of said springs being pivotally connected to said frame and the adjacent ends of said springs being pivotally connected to the ends of said rocker arms, and means for locking said rocker arms against pivotal movement, said means including an upstanding lug on each rocker arm between the ends of said rocker arm, a fluid-pressure cylinder adjacent the opposed ends of each said lug, a piston movable in each cylinder and bearing on said lug, a common fluid-pressure system interconnecting said cylinders and a normally open valve in said system operatively connected to said brake actuating means whereby said valve is closed and said rocker arm locked upon operation of said wheel brakes.

References Cited in the file of this patent

UNITED STATES PATENTS

| 1,419,430 | Wheatley | June 13, 1922 |
| 2,028,491 | Barrett | Jan. 21, 1936 |
| 2,670,201 | Rossman | Feb. 23, 1954 |
| 2,788,222 | Wilson | Apr. 9, 1957 |

FOREIGN PATENTS

| 503,441 | Great Britain | Apr. 6, 1939 |